United States Patent [19]

Mies

[11] 3,973,481
[45] Aug. 10, 1976

[54] APPARATUS FOR COOKING CHICKEN

[75] Inventor: Carl P. Mies, West Bend, Wis.

[73] Assignee: Mies Filter Products, Inc., West Bend, Wis.

[22] Filed: July 24, 1974

[21] Appl. No.: 491,390

[52] U.S. Cl. .................................. 99/408; 426/438
[51] Int. Cl.² ........................................... A47J 37/12
[58] Field of Search ............ 99/408, 330, 337, 403, 99/407, 444–445; 126/350–351, 373, 376; 210/153, 167, 171, 406, 409, 416, DIG. 8; 426/438

[56] References Cited
UNITED STATES PATENTS

| | | | |
|---|---|---|---|
| 2,125,862 | 8/1938 | Ratcliff | 99/408 |
| 2,477,404 | 7/1949 | Butt, Jr. | 210/DIG. 8 |
| 3,159,095 | 12/1964 | Wagner | 99/408 |
| 3,194,662 | 7/1965 | Nelson | 99/403 X |
| 3,280,722 | 10/1966 | Rahauser | 99/408 X |
| 3,337,055 | 8/1967 | Starnes et al. | 210/DIG. 8 |
| 3,368,682 | 2/1968 | Boots | 99/408 X |
| 3,495,525 | 2/1970 | Piotrowski | 99/403 X |
| 3,501,316 | 3/1970 | Guthrie, Sr. | 99/407 X |

Primary Examiner—Harvey C. Hornsby
Assistant Examiner—Arthur O. Henderson
Attorney, Agent, or Firm—Mann, Brown & McWilliams

[57] ABSTRACT

Method and apparatus for deep frying of chicken serving pieces in which the chicken serving pieces are immersed in cooking oil contained in a cooking chamber having a valve controlled discharge outlet at its lower end, and a filter unit within the cooking chamber through which the oil flows on being discharged from the chamber, in which, when filtering of the cooking oil is desired, the chamber is sealed as for pressure cooking and is connected to a source of compressed air for pressure discharging of the cooking oil through the chamber outlet, and thus through the filter unit, into a holding container located at atmospheric pressure conditions, after which the chamber is opened for cleaning purposes and cleaning and replacement of the filter unit. After the filter unit replacement is applied to its operating position within the chamber, the chamber is again sealed as for pressure cooking purposes and then is connected to a source of vacuum to enable atmospheric pressure acting on the oil to return the oil to the chamber through its outlet and the filter unit, whereby a second filtering of the reusable cooking oil is obtained. Enough new cooking oil is then added to the cooking chamber to bring the cooking oil level up to is desired level.

4 Claims, 5 Drawing Figures

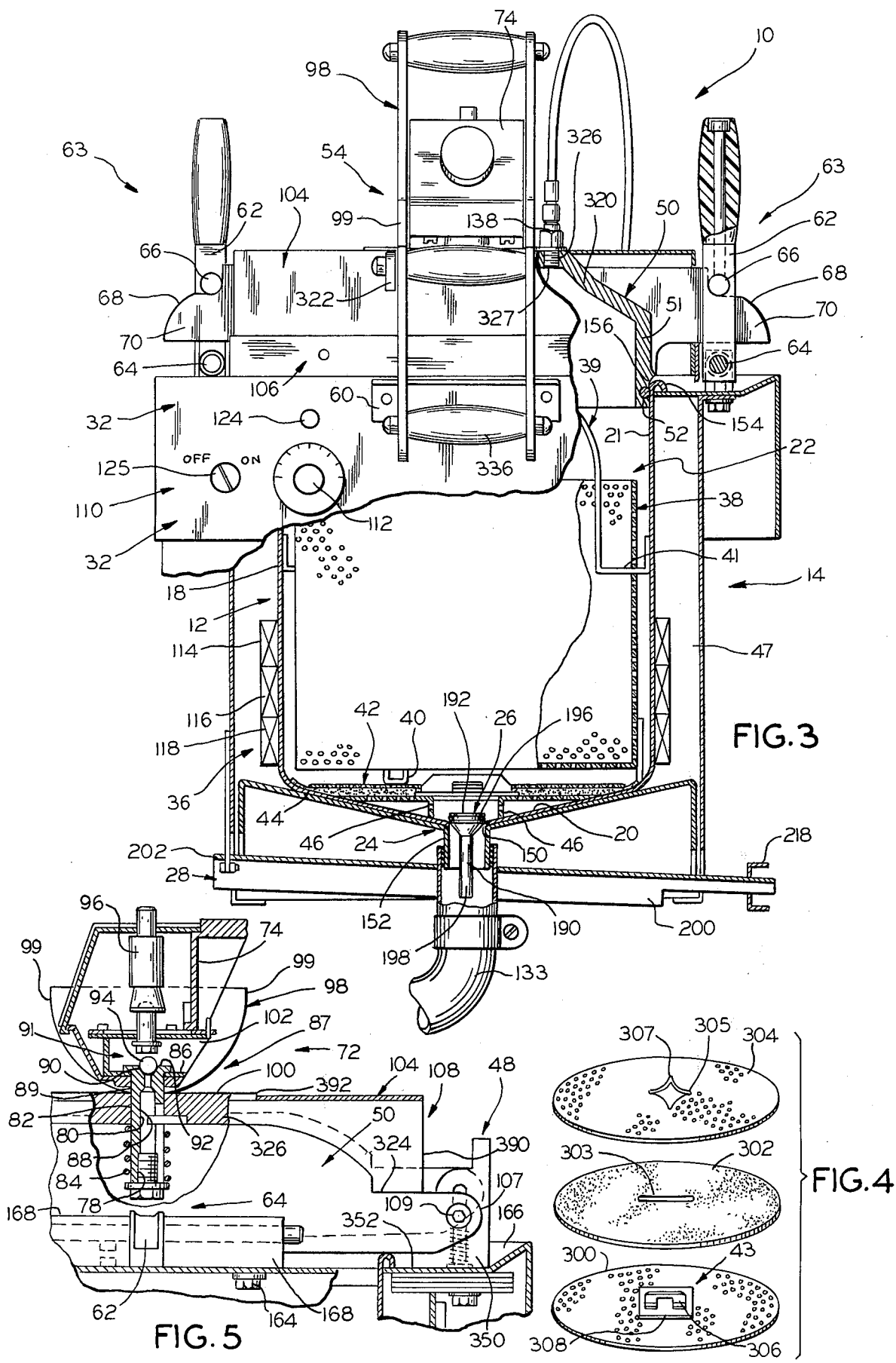

APPARATUS FOR COOKING CHICKEN

This application is directed to improvements in the method and apparatus for cooking chicken disclosed in the applicant's copending application Ser. No. 272,180, filed July 17, 1972, now U.S. Pat. No. 3,845,702, granted Nov. 5, 1976 which was a division of the applicant's abandoned application Ser. No. 24,517, filed Apr. 1, 1970 now abandoned.

This invention relates to the deep fat frying of chicken in the fast food field, and more particularly to an arrangement for removing and returning the cooking oil from and to the chamber, for filtering purposes, without requiring mechanical displacement type pumping action on the oil.

My U.S. Pat. No. 3,845,702 discloses a deep fat fryer and a method of cooking chicken serving pieces using same in which the chicken and cooking oil are employed in a ratio of one to two, respectively, as to weight, and are placed in a smooth walled generally cylindrical cooking chamber defined by the fryer cooking vessel, with the fryer being provided with a heater device of the electric band type located exteriorly of and about the cooking vessel but spaced from the lower end of same and outside of same to provide hot side wall heat input. The cooking chamber has a discharge outlet at its lower end above which is mounted a filter paper equipped filter unit through which the cooking oil is filtered on opening of the valve discharge outlet opening for filtering purposes. The chamber discharge opening is normally closed, and assuming that the cooking chamber contains the requisite amount of cooking oil, the chicken is disposed within a basket removably positioned in the cooking chamber that seats on the chamber bottom above the filter unit that also rests on the chamber bottom above the drain outlet, and in a relatively cool area of the chamber.

After the cooking oil has been heated to approximately 400° F., the chicken is dropped into the cooking oil and within the basket and allowed to brown until it is approximately a cornflake color, after which the chamber is closed and sealed for cooking under pressure conditions on the order of 14 to 15 psig. When the vessel is up to pressure, the current to the vessel heater is turned off and nine minutes after the vessel is closed, the chicken is removed to a holding oven. The cooking oil is then reheated to the 400° F. temperature level for readying the apparatus to receive the next batch of chicken to be cooked, and drive moisture from the filter paper to maintain it in filtering condition.

After approximately six batches, the cooking oil is drained under pressure through the filter unit into a holding container, for filtering purposes. After cleaning of the cooking chamber and replacement of the filter unit, the cooking oil is returned to the cooking chamber by manually lifting the holding container up and pouring the cooking oil back into the chamber through its open upper end. Sufficient make up cooking oil is added to restore the original cooking oil amount for cooking like batches of chicken in like manner.

The fryer and method of my said application permits repeated reuse of the cooking oil, supplemented as needed by make up cooking oil, to maintain the two to one cooking oil to chicken ratio disclosed in said application, with consequent economies of operation. It is apparent, of course, that the filtering and handling of the cooking oil following this general procedure insures a thorough filtering of the cooking oil with minimum mechanical action on the cooking oil to avoid premature breakdown of the oil.

A principal object of this invention is to provide a method and apparatus for cooking chicken in which the cooking oil, after cooking a number of batches of chicken, is given a two way filtering treatment by using gas pressure differentials to both discharge the cooking oil from the fryer and return it to the fryer for continued use.

Another principal object of the invention is to provide an arrangement for filtering the cooking oil of fryers that avoids manual handling of the oil to return it to the cooking chamber or mechanical action on the oil to induce the fluid flow of same back to the cooking chamber.

Another important object of the invention is to provide for the filtering of the cooking oil, by removing the oil from the cooking chamber and returning it to same, without subjecting the cooking oil to mechanical action on same for inducing the fluid flow required for this purpose.

Another important object of the invention is to provide a differential pressure method of moving cooking oil between the fryer and cooking chamber and its holding container that effects a two way filtering action on the cooking oil.

Other objects of the invention are to generally improve the method of apparatus of my said application, eliminate the need for manual handling of the cooking oil to return it to the cooking chamber, and to provide an apparatus for cooking chicken and filtering the cooking oil used in same, for repeated use of the cooking oil, that is economical of manufacture, convenient and easy to operate, and long lived in use.

In accordance with this invention, the cooking chamber takes the form of that disclosed in my said application, wherein the vessel that defines the cooking chamber is smooth walled and has a valve control discharge opening or outlet at the lower end of same, and a filter unit overlying the discharge opening and resting on the cooking chamber bottom, through which the cooking oil is to pass when being discharged from the chamber for filtering purposes. When filtering is desired, the chamber is closed and sealed as for pressure cooking, and is connected to a source of compressed air, after which the cooking chamber discharge outlet is opened to permit pressure discharge of the cooking oil through the filter unit, out of the chamber, and into a holding container through a conduit extending between the cooking chamber outlet and the holding container. During this operation, the solid materials in the cooking oil build up on top of the filter unit.

When the cooking oil has been transferred to the holding container, the source of compressed air is disconnected, the chamber opened for cleaning of same and replacement of the filter unit, after which the cooking chamber is again sealed and then connected to a source of vacuum to permit atmospheric pressure acting on the cooking oil in the holding container to return the cooking oil to the cooking chamber for further filtering through the filter unit. When the cooking oil is returned to the cooking chamber, the chamber discharge opening is closed, the source of vacuum disconnected, and the chamber opened to add to the freshly filtered cooking oil enough make up cooking oil to maintain the two to one cooking oil to chicken ratio disclosed in said application, after which cooking may proceed in the normal manner.

Other objects, uses and advantages will be obvious or become apparent from a consideration of the following detailed description and the application drawings. In the drawings:

FIG. 3 is a front elevational view of the upper portion of the fryer, with parts being broken away and/or shown in section to reveal other parts, with the vessel discharge valve shown partially open;

FIG. 4 is a diagrammatic exploded perspective view of the filter unit employed in connection with the invention; and FIG. 5 is a fragmental sectional view illustrating the general nature of the fryer cooking chamber cover hinging arrangement employed in the illustrated embodiment.

However, it is to be distinctly understood that the specific drawing illustrations provided are supplied primarily to comply with the requirements of the Patent Laws, and that the invention may have other specific embodiments that will be obvious to those skilled in the art, and that are intended to be covered by the appended claims.

GENERAL DESCRIPTION

The invention of this application is applied to the fryer disclosed in my said U.S. Pat. No. 3,845,702 and for purposes of properly understanding the invention, a portion of the disclosure of said application is included herein. Reference may also be had to Mies and Shelton U.S. Pat. No. 3,610,113, which also discloses the general type of fryer involved.

Figure 1:
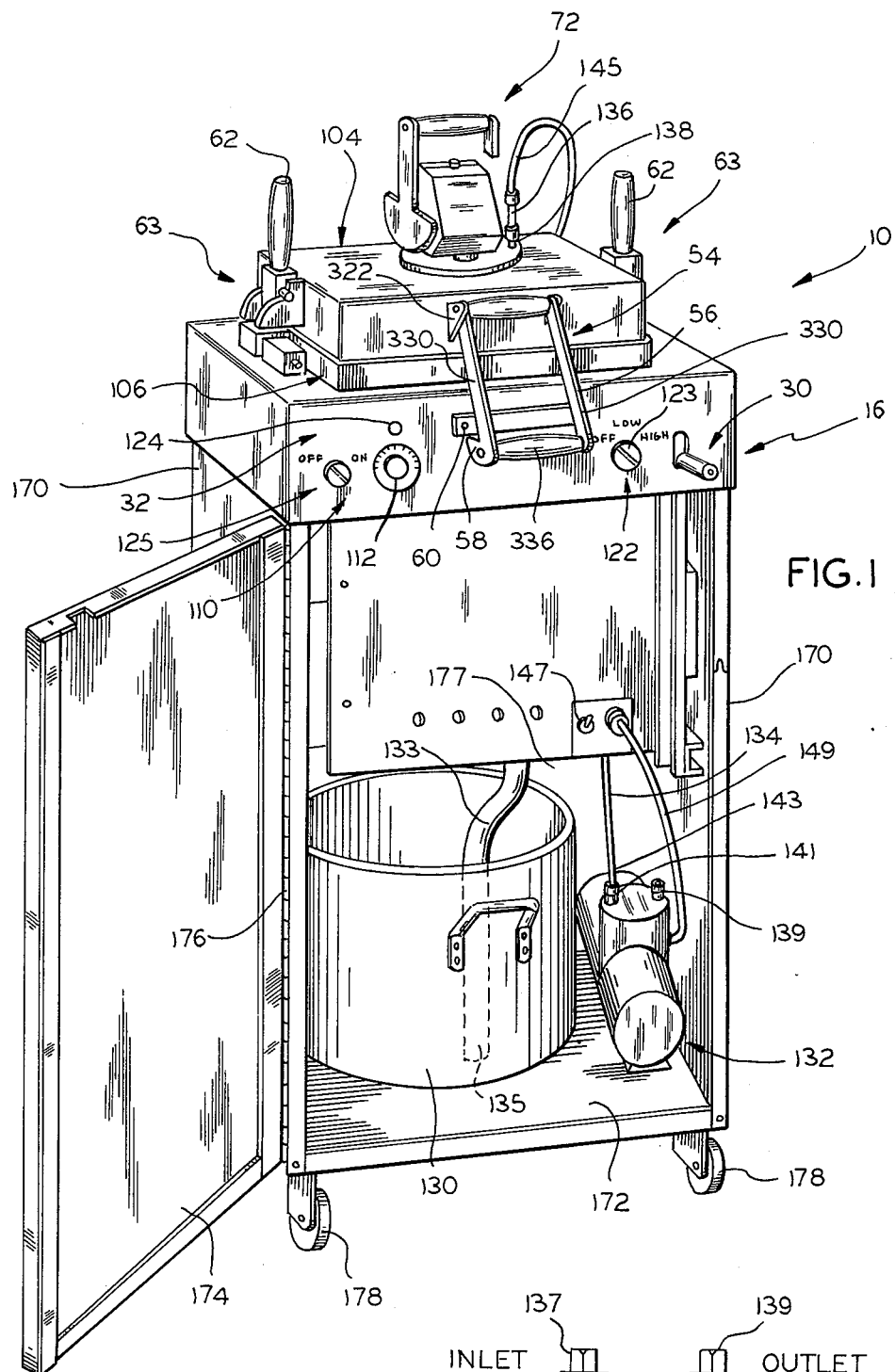
FIG. 1 is a perspective view of one embodiment of the fryer showing the interior of the cabinet of which the fryer of the present invention forms a part, and several pieces of associated equipment that are involved in same.
Figure 2:
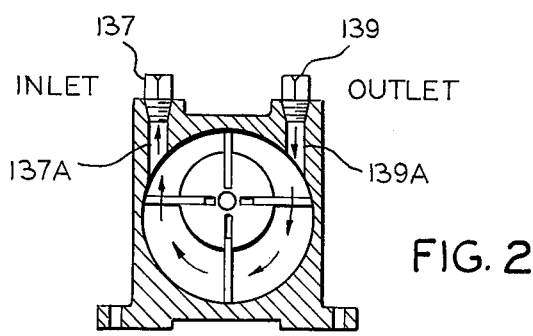
FIG. 2 is a diagrammatic view generally illustrating the general nature of the differential pressure effecting apparatus employed to induce the flow of cooking oil between the fryer cooking chamber and the holding container for purposes of filtering same and returning same to the cooking chamber.

Reference numeral 10 of FIGS. 1 and 3 generally indicates a fryer to which the present invention is applied, which fryer comprises a cooking vessel 12 (see FIGS. 3 and 5) mounted in a suitable housing and supporting structure 14 that is incorporated in a suitable cabinet 16 which houses the vessel 12 and its associated components.

The vessel 12 is generally cylindrical in configuration and comprises a cylindrical side wall 18 merging into a frustoconical bottom wall 20 which together define a smooth walled cooking or frying compartment or chamber 22 that is free of any and all protuberances, recesses, and the like that would form a trap or lodging place for solids.

The bottom wall 20 of the vessel 12 defines an outlet 24 for draining cooking oil from chamber 22, fluid flow of which is controlled by a valve device 26 that is raised and lowered through operating linkage 28 that is in turn controlled by a handle 30 shown in the open position of the valve in FIG. 1 at the front side 32 of the fryer, as distinguished from its rear side 34.

The vessel 12 is heated by heater device 36, and chicken to be cooked is placed in dry bread serving piece form within the vessel 12 in a basket structure 38 (see FIG. 3) that includes legs 40 for supporting same on the bottom of the vessel 12, and a handle 39 for manipulating the basket, which handle 39 is arranged to have extensible and retractable end portions 41. Interposed between the basket 38 and the bottom wall 20 of the vessel is filter device 42 that rests on the vessel bottom wall at its rim 44 and engages the vessel bottom wall 20 adjacent the drain outlet 24 through bracing legs or projections 46. The space 47 about the vessel 12 and enclosed by housing structure 14 is filled with insulating material such as fiberglass to keep the heat generated by the heater device 36 concentrated in the vessel 12.

Pivotally connected to the housing structure 14 by the special hinge construction 48 (see FIG. 5) is a cover 50 that includes about its rim 51 a seal 52 (see FIG. 3) proportioned for sealing engagement with internal wall surface 21 of vessel 12 in the closed position of the cover. Hinge structure 48 is fully disclosed in said Mies and Shelton Patent and thus is only diagrammatically illustrated in FIG. 5. Associated with the cover 50 is a catch device 54 at the front 32 of the fryer 10 comprising a swing arm structure 56 formed with catch shoulders 58 to cooperate with the catch element 60 fixed to the housing structure 14.

On either side of the cover 50 are cam locks 63 comprising hold down swing arms 62 pivotally connected as at 64 to the housing structure 14 and carrying rollers 66 for camming cooperation with cam surfaces 68 of the spaced flanges 70 that are formed on either side of the cover 50. Cover 50 carries pressure regulator unit 72 which controls the maximum pressure that can be generated within the vessel 12 during the frying operation.

The pressure regulator unit 72 is a modification of that which is fully disclosed in Winston L. Shelton U.S. Pat. No. 3,590,871. It generally comprises (see FIG. 5) a valve body structure 74 mounted on a stem 78 that is formed with a central passage 80, and that is slidably mounted within opening 82 formed in the cover 50 such that compression spring 84 that biases the stem inwardly of the cover will seat annular seat 86 of valve body 74 against O-ring seal 88 that is received about stem 78, which seal 88 is in turn seated against annular seat 89 that is formed in cover 50 to form a relief valve 87. The passage 80 of stem 78 terminates in an outlet port 90 defining a seat 92 on which is positioned a ball member 94 that serves to close off port 90 under the bias of weight 96. Spring 84 is given a strength such that pressures on the order of 17 psi within vessel 12 (above atmospheric pressure) will move the stem 78 upwardly of FIG. 5 to expose the stem passage 80 to the atmosphere, while the weight 96 has a weight such that ball 94 will be lifted from its sealing relation with seat 92 when pressures within vessel 12 are on the order of 14–15 psig, preferably 14.5 psig. Stem seat 92, ball 94 and weight 96 form a valve device that is generally indicated at 91, which valve device 71 is opened as part of the cooking process by the pressure build up in the fryer after it is sealed with the chicken being cooked within same.

Regulator 72 includes swing or rocker arm device 98 that is pivotally connected to the valve body 74 and is provided with cam surfaces 99 forwardly and rearwardly of the regulator that are formed to cooperate with the top surface 100 of cover 50 to permit the operator to manually lift the stem 78 sufficiently to expose its passage 80 to the atmosphere for manually venting the vessel 12 through valve 87.

The filter unit 42 generally comprises (see FIG. 4) a perforated filter plate 300 provided with a handle structure 43, a sheet of filter paper 302 of any appropriate type, and a perforated protector plate 304. The plates 303 and 304 may be formed of any suitable perforated metallic material, and handle structure 43 generally comprises a suitable handle member 306 affixed to a suitable base plate 308, as by welding, which in turn is suitably affixed to filter plate 300 in any suitable manner, as by spot welding.

Associated with the cover 50 is a splash shield structure 104 that is anchored to the cover 50 by yoke 106 and is formed to define at the rear of the cabinet a discharge opening 108 from which fluids under pressure are discharged away from the operator in the event that seal 52 should fail or cam lock devices 63 were actuated to release the cover 50 prematurely, as disclosed in said U.S. Pat. No. 3,845,702.

The hinge structure 48 includes a lost motion arrangement upwardly of the vessel 22, such that when the cam lock devices 63 are moved to their release positions, the cover will move from the level position of FIG. 5 to an inclined position under the biasing action of the springs 107 of said Mies and Shelton U.S. Pat. No. 3,610,133, in which the seal 52 at the rear of the vessel 12 is freed from sealing engagement with the wall surface 21 thereof, which permits fluids under pressure to escape rearwardly of the cabinet 16 under the guiding action of the splash shield 104, as more fully disclosed in said U.S. Pat. No. 3,610,133.

The cabinet 16 in the form illustrated includes operating panel surface 110 and includes a thermostat control knob 112 cooperating with an indicator light 124 serving as a datum reference for knob 112. Knob 112 serves as a means for controlling the amount of heat supplied by the heater device 36, which is in the form of three band type heating devices 114, 116 and 118 (which are each 200 watt devices in the form illustrated) operably associated with the thermostat device of said U.S. Pat. No. 3,610,133 (see FIG. 12 thereof), the control knob 112 being appropriately calibrated for indicating the temperature that the cooking oil in the vessel will be heated to by heater device 36 for any one position of the knob 112 over a suitable temperature range that is consistent with the heat supply requirements that are indicated hereinafter.

The panel 110 also includes two way off-on switch device 122 controlled by control knob 123 which is incorporated together with the thermostatic control in a suitable electric circuit system to connect all of the heating band devices 114, 116, 118 to a suitable source of power for operation in the manner disclosed in said U.S. Pat. No. 3,845,702. Control knob 125 is part of a suitable timer off-on switch which actuates a suitable buzzer (not shown) at the end of the pressure cooking timing cycle which is set. Operating handle 30 for operating drain valve 26 also protrudes through the operating panel surface 110. The normal position for the operator to stand is in front of the panel surface 110.

The cabinet 16 in the form shown is provided with a holding container 130 into which cooking oil from a vessel 12 is drained for filtering or replacement purposes.

In accordance with the present invention, the vessel drain outlet 24 is connected to the holding container 13 by conduit 133 which has its lower end 135 disposed closely adjacent the bottom of the container 130. Cabinet 16 is provided with an air compressor 132 of a suitable type which has connections 137 and 139 in communication with the high and low pressure sides 137A and 139A of the compressor unit 132, to which suitable conduit 134 having end fitting 141 at its end 143, may be alternately secured thereto for purposes of practicing the present invention. The other end 145 of the conduit 134 is provided with suitable end fitting 136 adapted for securement to suitable quick disconnect type fitting 138 applied to cover 50 through which air may be supplied to or removed from vessel 12, on application of fitting 136 thereto, when the cooking oil is to be processed pursuant to the present invention. Air compressor 132 is actuated by suitable off-on switch 147, conduit 149 leading to the motor of the compressor unit 132.

Assuming that the apparatus 10 is put into operation in the manner disclosed in said U.S. Pat. No. 3,845,702, and that the apparatus 10 has been operated to cook up to about six batches of chicken, the knob 122 is moved to the off position, the cover 50 is clamped in its fully closed position, employing the cam locks 63 in the manner described in said application Ser. No. 272,180, and regulator unit 72 is operated to close the relief valve 87 it forms in cooperation with the cover 50 (the upright position of rocker arm device 98).

This seals off the vessel 12 for operation of the compressor 132 in accordance with this invention, and for purposes of draining the cooking oil from the vessel 12 for filtering purposes, the end 143 of conduit 134 is connected to the compressor high pressure side fitting 137 and conduit fitting 136 is connected to the cover fitting 138, after which the compressor off-on switch 147 is actuated to turn on the compressor motor, and air under pressure is supplied to the sealed off vessel 12 up to the point where it starts escaping through the regulator 72. The operator then operates handle 30 of the linkage 28 to open the discharge control valve 26 by moving handle 30 downwardly (and thus to the position shown in FIG. 1), which moves valve 26 upwardly to its open position (see FIG. 3) thereby permitting the pressure within the vessel 12 to force the cooking oil therein through the filter unit 42 and out through port or drain opening 42 into container 130 through conduit 133. The filtering of the cooking oil through filter unit 42 under the high pressure conditions indicated effects a drying of the solids collecting on top of the filter unit, which makes for ready and easy removal of the same from the fryer after release of pressure from the vessel 12 and opening cover 50, by applying the hooked end of a suitable implement to the handle 43 of the filter device 42 to remove the filtered out solids and filter unit 42 as a whole from the vessel 12.

The inside of vessel 12 should then be cleaned by taking a damp towel and starting at the lower end of the vessel, wiping the vessel interior wall off, moving upwardly, the steam resulting from the heat remaining in the vessel adjacent the heater device 36 making the valve act as a steam cleaner, and thus avoiding having to use detergents or soap in the vessel.

A replacement filter unit 42, equipped with fresh filter paper 302, is then positioned within the vessel in the manner shown in FIG. 3, whereupon the filtered cooking fat is returned to the vessel. In accordance with this invention, the return of the cooking oil to the vessel is effected employing the compressor 132, and for this purpose, the cover 50 is again clamped in its fully closed and sealed position, the regulator 72 operated to close the relief valve 87 it controls, and the fitting 141 of the conduit 134 is connected to the vacuum or low pressure fitting 139 of the compressor 132. Assuming that the compressor is operating, air will now be removed from the space enclosed by the cover 50 and vessel 12 thereby effecting low pressure or vacuum conditions within the vessel, and assuming that the discharge valve 26 is in its open position, atmospheric pressure acting on the upper surface of the cooking oil in holding container 130 will act to return the cooking oil to the vessel through the conduit 133, with the cooking oil thereby being drawn through the replacement filter unit 42 for a second filtering action. When air starts to suck up into the lower end 135 of the conduit 133, the valve 26 is closed by operating handle 30 (to return valve 30 to its upper position), thereby retracting valve 26 into discharge opening 24. Compressor 132 may then be shut off.

The cover 50 is again opened (after opening valve 87) and the freshly filtered cooking oil is supplemented by new cooking oil up to the original volume indicated, that is, that which would provide the preferred two to one oil to chicken ratio.

The double filtering action on the cooking oil provided by this invention not only eliminates the need for the holding container 130 to be manually lifted and tilted to return the cooking oil to the vessel 12, but also the removal of solids from the cooking oil is significantly improved. While the bulk of the solids are separated from the cooking oil by the pressure discharge of the cooking oil from the vessel, through the filter unit 42, the cooking oil as received in the holding container 130 does contain "fines," an undesirable portion of which would be returned to the vessel if the cooking oil is merely poured back into the vessel without further filtering. The second filtering operation performed by this invention stops the entry into the vessel of a great proportion of these fines which are thus retained below the filter unit. Furthermore, a significant amount of fines are left at the bottom of the holding container 130 after the cooking oil is removed therefrom by operation of the vacuum side of compressor 132.

It is also important to note that the cooking oil is kept shielded from the ambient air during filtering and has minimum exposure to the ambient air during the entire filtering procedure. This, together with the preheating of the cooking oil to the 400 degree F. level as part of the cooking procedure of said U.S. Pat. No. 3,845,702 avoids to a significant degree the two principal causes for cooking oil break down, namely hydrolysis (a reaction of fat with water) and oxidation (a reaction of fat with atmospheric oxygen). The result is that a consistently high quality cooked produce can be provided with multiple use of the same cooking oil.

SPECIFIC DESCRIPTION

As indicated, the vessel 12 is of smooth walled construction, and the heat applying source is located exteriorly of the cooking chamber 22. There are no protuberances, indentations, or ledges, etc. in the side wall of the vessel or disposed within the cooking chamber on which, or in which, solids could accumulate and char during the cooking process. This, plus the tendency of the solids to settle out at the relatively cool location of the filter device 42, the periodic filtering of the cooking oil, and the adding of the make up oil after filtering results in the fatty acid content of the cooking oil being kept within the desired range of between 0.13 and 0.27 per cent by volume for a substantial number of uses of the same cooking oil charge.

The vessel 12 may be formed from any suitable material that is suitably formed as a one piece construction to define the side wall 18 and bottom wall 20 that defines opening 150 which forms outlet 24. The bottom wall 20 has affixed thereto a sleeve 152 within which the valve member 26 operates to seal off the outlet 24.

The vessel 12 at its upper end defines a curved rim 154 that is continuous about the circumference of the vessel and defines an inwardly converging cam surface 156 for insuring that the cover seal 52 is guided into effective sealing relation with the vessel internal wall surface 21.

The valve 26 comprises a stem portion 192 which is suitably recessed to receive a suitable O-ring seal element 196 that is in sealing relation with the sleeve 152 of the vessel 12 in the closed position of valve member 26.

The valve member stem portion 190 is coupled by pin 198 to operating lever 200 of operating linkage 28 that is fully described in said application Ser. No. 272,180 and said U.S. Pat. No. 3,610,133. As therein disclosed, lever 200 is operated by a lever 218 that is in turn connected to an actuating arm (not shown) to which handle 30 is suitably connected.

Thus, when the operator pushes the handle 30 downwardly to the position of FIG. 1, the operating linkage is operated to raise the valve member 26 from its sealing position to its open or draining position, while upward movement of the handle 30 returns the valve member to its sealing position with seal 196 in engagement with sleeve 152.

With reference to the filter unit 42, the lower plate 300 at its mid-portion has the fingers or projections 46 struck downwardly to support the filter unit 42 at the mid-portion thereof as indicated in FIG. 3, with the base plate 308 of handle 43 overlying the void formed in the plate 300 by the struck projections 46.

The filter paper 302 seats directly on top of the filter plate 300 with the filter paper being formed with a suitable slot 303 to receive the handle 306.

The protector plate 304 sits on top of filter paper 302 and is formed with the cross slots 305 and 307 that are proportioned to alternately receive the handle 306.

As previously indicated, the filter unit 42 in use is disposed at the bottom of the vessel 12 resting on its rim portion 44. The heater device 36 is positioned so that the filter unit 42 will be disposed below the lowermost band type gear 118 and thus in a relatively cool area of the vessel.

The relationship of the filter unit 42 to the heater 36, as disclosed in said U.S. Pat. No. 3,845,702 is an important consideration due to the fact that as the cooking oil cools down during the cooking of a batch of chicken, water tends to condense in the area of the filter and dampen the filter paper. Experience has shown that if the filter paper is wet at the time the filtering is to take place, the paper will not filter satisfactorily as its pores close when wet. Consequently it is important that the filter unit be located sufficiently close to the heater device 36 so that the heat of same will maintain the filter paper 302 sufficiently dry to serve its filtering function without resulting in the charring of the solids that collect on top of the filter unit. The relationship of parts shown in FIG. 3 satisfies these requirements, and in a commerical embodiment the upper surface of the filter plate 304 is about threequarter inch below the level of the lower edge of the lowest heating band 118. If the filter unit 42 were level with the lower edge of the heating band 118, the solids collecting on the filter unit would char, and if the filter unit 42 were disposed lower than the preferred position indicated, the filter unit 42 would not be sufficiently heated on preheating of the cooking oil to drive moisture out of the filter paper.

On discharge of the cooking oil in accordance with the procedure heretofore described, the cooking oil is forced through the filter unit 42 toward the port 24, and thus all of the solids in the cooking oil converge on or are caught by the filter unit 42 for ready removal by removing the filter unit in the manner already indicated.

The cover 50 is made from suitable heavy gauge metal having the general configuration indicated in the drawings to define a dome-like cover portion 320, a pair of forwardly extending lugs 322, a pair of rearwardly extending lugs 324 (see FIG. 5), and the flanges 70 on either side of the cover portion 320.

At its mid-portion, the cover 50 is formed to define a platform 326 to which the fitting 138 is applied in a suitable threaded opening 327 that is well above the top of the vessel 12 when the cover is in its closed position so that when the conduit 134 is connected to the compressor low pressure or vacuum side, no cooking oil will be drawn into the compressor.

With reference to the cover front catch device 54, handle element 336 interposed between arm member 330 of swing arm 56 serves as an aid to move the cover between its full open and full closed positions. Reference may be had to said Patent No. 3,610,133 for a complete disclosure of the catch device 54.

The housing structure 14 and the cabinet 16 may be of the general type disclosed in said Patent, with the cabinet thus having suitable side walls 170, floor 172, door 174 hinged to one of the side walls 170 by suitable piano type hinge 176, a rear wall 177, and suitable supporting wheels 178 or the like which in the form illustrated are caster wheels of any appropriate make. The cabinet side walls and rear wall enclose the vessel housing structure 14, and in use, the air space between the two serves to supplement the insulation of vessel 12.

The showing of the compressor 132 is for illustrative purposes only, as any suitable pressure differential inducing mechanism of the type indicated may be employed. A commercial embodiment of the invention employs a diaphragm type air compressor, made by Thomas Industries, Inc., equipped for alternate use of the pressure and suction sides of the unit. Where a compressor of the type illustrated is employed, it may be desirable to use a brake arrangement on the rotor shaft that goes into effect automatically when the compressor is shut off, as will be obvious to those skilled in the art.

It will therefore be seen that the invention provides apparatus and method for double filtering of the cooking oil employed in the fryer 10 to condition it for repeated reuse in cooking chicken batches following the general procedure of said U.S. Pat. No. 3,845,702. The pressure discharge of the cooking oil through the filter unit 42 filters out the major solid components in the cooking oil, which are then removed by removing the filter unit that is employed for this purpose. The vacuum induced or low pressure return of the cooking oil to the cooking chamber is effected through a fresh filter unit which filters out the fines that reach the cooking chamber for this purpose and keeps them below the filter unit.

It is also to be noted that the cooking oil is removed from and returned to the cooking chamber without having to be acted on directly by a pump or the like. This avoids mechanical working of the cooking oil, as would be necessarily involved by a mechanical displacement inherent in pumps and the like, thus contributing to the longer useful life of the cooking oil and avoiding the need of having to use a pump especially suited for use with cooking oil.

The matter filtered out of the cooking oil by the return of same to the cooking chamber, in remaining below the filter unit 42, is thus disposed at a relatively cool area which avoids charring of same. This matter thus never really enters the cooking chamber as it is discharged when the cooking oil is next filtered.

It will be convenient, of course, to have a number of filter units 42 in readiness to practice the invention, with such units being equipped with fresh filter paper prior to each period of extended operation of the fryer.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:
1. In a deep fat fryer arrangement comprising:
a vessel defining a cooking chamber proportioned to receive cooking oil and chicken serving pieces to be cooked, a drain opening at the bottom of said vessel, valve means for opening and closing said drain opening, a holding container positioned to receive cooking oil discharged from said vessel through said drain opening, a removable cover for closing off the top of said vessel, means for clamping said cover in closed relation to the vessel for cooking the chicken serving pieces under pressurized conditions, means for sealing off said chamber when said cover is in closed relation thereto, heater means about said vessel and spaced at a level above the level of the bottom of said vessel for heating cooking oil received in the chamber to a temperature range for cooking chicken serving pieces received in the oil when the oil is in the chamber, and filter means within said chamber and between the level of said heater means and the level of said vessel bottom for filtering therethrough of cooking oil drained from said vessel before it passes through said valve means, and disposed to permit solids in the oil to collect on its upper side,
the improvement comprising:
conduit means extending between said drain opening and said container for conveying cooking oil therebetween, and
means for subjecting said chamber when said cover is clamped in said closed relation and sealed by said sealing means, to differential pressures, when said valve means is open, for inducing flow of the cooking oil through said filter means and said drain opening and between said chamber and said container through said conduit means and free of mechanical pumping action on said cooking oil, said subjecting means comprising:

means for supplying gas under pressure to said chamber for draining the oil from the vessel, through said filter means, said valve means and said conduit means, into said container, under fluid pressure conditions in said chamber when said valve means is open, and means for drawing air from said chamber for establishing vacuum conditions within said chamber to effect return of the oil from the container through said conduit means, said valve means and said filter means, to said chamber, under atmospheric pressure conditions acting on the cooking oil in the container, whereby the cooking oil is moved between said chamber and said container through said conduit means free of mechanical pumping action thereon by the differential pressure action of said subjecting means, and the cooking oil in being so moved is filtered both in draining and return from and to the chamber, and materials filtered from the cooking oil on return to the chamber remain below said filter means.

2. In a deep fat fryer arrangement comprising:

a vessel mounted in said housing structure and a housing structure, defining a cooking chamber proportioned to receive cooking oil and chicken serving pieces to be cooked, a drain opening at the bottom of said vessel, valve means for opening and closing said drain opening, a holding container positioned in said housing structure to receive cooking oil discharged from said vessel through said drain opening, a removable cover for closing off the top of said vessel, means for clamping said cover in closed relation to the vessel for cooking the chicken serving pieces under pressurized conditions, means for sealing off said chamber when said cover is in closed relation thereto, heater means about said vessel and spaced at a level above the level of the bottom of said vessel for heating cooking oil received in the chamber to a temperature range for cooking chicken serving pieces received in the oil when the oil is in the chamber, and filter means within said chamber and between the level of said heater means and the level of said vessel bottom for filtering therethrough of cooking oil drained from said vessel before it passes through said valve means, and disposed to permit solids in the oil to collect on its upper side, the improvement comprising:

conduit means extending between said drain opening and the lower portion of said container for conveying the cooking oil therebetween, and means for acting on said cooking oil in said chamber, but free of mechanical engagement therewith, to, when said cover is clamped in said closed relation and said valve means is open, induce flow of the cooking oil between said chamber and said container through said filter means and said drain opening and said conduit means, said acting means comprising:

means for supplying compressed gas to said chamber for draining the cooking oil from the vessel through said filter means, said valve means, and said conduit means under greater than atmospheric pressure conditions within said chamber when said valve means is open, and means for connecting said chamber to a source of vacuum for establishing less than atmospheric pressure condition in said chamber to effect return of the cooking oil, from the container through said conduit means, said valve means, and said filter means, to said chamber under atmospheric pressure conditions acting on the cooking oil in the container when said valve means is open, whereby the cooking oil is moved between said chamber and said container through said conduit means free of mechanical pumping action thereon by the differential fluid pressures provided by said acting means, and the cooking oil is filtered both in draining and return from and to the chamber.

3. The improvement set forth in claim 2 wherein:

said filter means comprising a filter unit extending across said chamber and including filter paper through which the cooking oil is to pass on opening of said valve means and operation of either said supplying means or said connecting means to filter the cooking oil.

4. The improvement set forth in claim 2 including:

an air compressor positioned in said housing structure and having an air intake inlet and a compressed air discharge outlet, said supplying means comprising conduit means for connecting said air compressor outlet with said chamber with said air compressor inlet being free of connection to said chamber, said connecting means including means for connecting said air compressor inlet to said chamber with said air compressor outlet being free of connection to said chamber.

* * * * *